(12) United States Patent
Kim et al.

(10) Patent No.: US 7,786,696 B2
(45) Date of Patent: Aug. 31, 2010

(54) BATTERY PACK CHARGED BY EXTERNAL POWER GENERATOR AND SUPPLYING DISCHARGE POWER TO EXTERNAL LOAD IN PARALLEL TO EXTERNAL POWER GENERATOR

(75) Inventors: Dong Rak Kim, Seoul (KR); In Seob Song, Seoul (KR); Jung Kurn Park, Seoul (KR); Sang Cheol Lee, Seoul (KR); Young Jae Kim, Seoul (KR)

(73) Assignee: Samsung SDI Co., Ltd., Suwon-si (KR)

( * ) Notice: Subject to any disclaimer, the term of this patent is extended or adjusted under 35 U.S.C. 154(b) by 517 days.

(21) Appl. No.: 11/829,336

(22) Filed: Jul. 27, 2007

(65) Prior Publication Data

US 2008/0054842 A1 Mar. 6, 2008

(30) Foreign Application Priority Data

Sep. 1, 2006 (KR) ...................... 10-2006-0084250

(51) Int. Cl.
*H01M 10/46* (2006.01)
(52) U.S. Cl. ..................................... 320/112
(58) Field of Classification Search ................ 320/101, 320/103, 107, 112, 114, 115, 116, 132, 134, 320/136; 429/12, 13
See application file for complete search history.

(56) References Cited

U.S. PATENT DOCUMENTS

| | | | |
|---|---|---|---|
| 4,652,769 A | * | 3/1987 | Smith et al. ................ 307/31 |
| 4,709,201 A | | 11/1987 | Schaefer et al. |
| 6,208,115 B1 | | 3/2001 | Binder |
| 6,639,815 B1 | * | 10/2003 | Gucyski ..................... 363/40 |
| 2001/0049038 A1 | | 12/2001 | Dickman et al. |
| 2002/0136939 A1 | | 9/2002 | Grieve et al. |
| 2004/0176859 A1 | * | 9/2004 | Chian et al. ................ 700/12 |

FOREIGN PATENT DOCUMENTS

| | | |
|---|---|---|
| JP | 9-199182 | 7/1997 |
| JP | 2002-208443 | 7/2002 |
| JP | 2004-208344 | 7/2004 |
| JP | 2004-247995 | 9/2004 |
| JP | 2006-166670 | 6/2006 |
| KR | 2001-45795 | 6/2001 |
| KR | 2005-12403 | 2/2005 |

OTHER PUBLICATIONS

Notice of Allowance issued by the Korean Intellectual Property Office in Korean Patent Application No. 2006-84250, Jul. 26, 2007.

* cited by examiner

*Primary Examiner*—Edward Tso
(74) *Attorney, Agent, or Firm*—Stein McEwen, LLP

(57) ABSTRACT

A battery pack that is charged with power generated in an external power generator and supplies battery power to an external load in parallel with the external power generator, and a power receiving device of a portable electronic device that receives and supplies battery power to an external load in parallel with the external power generator, the battery pack including: a battery cell to discharge power based on a charged amount of electric charge; an external power input terminal to receive power from an external power generator; a power output terminal to supply power to an external load; and a voltage transforming circuit to transform voltage of the power received through the external power input terminal to transfer the transformed voltage to the power output terminal.

47 Claims, 5 Drawing Sheets

BATTERY PACK CHARGED BY EXTERNAL POWER GENERATOR AND SUPPLYING DISCHARGE POWER TO EXTERNAL LOAD IN PARALLEL TO EXTERNAL POWER GENERATOR

CROSS-REFERENCE TO RELATED APPLICATION

This application claims the benefit of Korean Patent Application No. 2006-84250, filed on Sep. 1, 2006 in the Korean Intellectual Property Office, the disclosure of which is incorporated herein by reference.

BACKGROUND OF THE INVENTION

1. Field of the Invention

Aspects of the present invention relate to a battery pack that is charged with power generated in an external power generator and supplies discharge power to an external load in parallel with the external power generator.

Further, aspects of the present invention relate to a power receiving device that is internally mounted onto a portable electronic device, charges an external battery with power generated in an external power generator, receives the power generated in the external power generator and power discharged from the external battery in parallel, and supplies the received power to the electronic device.

2. Description of the Related Art

Various portable electronic devices (such as mobile phones, personal digital assistants (PDA), or the like) have been developed for processing digital information. While the portable electronic device initially employed only a primary battery, the portable electronic device has recently used a rechargeable secondary battery. However, in the case of the portable electronic devices such as a notebook computer, a digital multimedia broadcasting (DMB) receiver, a wireless mobile Internet terminal, etc., the capacity of the existing second secondary battery is insufficient to supply power to the portable electronic devices because the portable electronic devices are generally used for a relatively long period of time and consume a relatively large amount of power. Further, disadvantageously, the discharged secondary battery takes a relatively large amount of time to recharge.

For these reasons, there is a need for a separate power generator to supply power to the portable electronic device with a high power consumption. Accordingly, among the power generators that have been developed hitherto, a fuel cell adapted for a smaller device has been researched.

FIGS. 1 and 2 illustrate a conventional notebook computer having power supplied from a fuel cell thereto. In FIG. 1, the power generated in the fuel cell is supplied to the notebook computer through a separate external power input terminal without using power from a battery. In FIG. 2, the power generated in the fuel cell is used to charge the battery. In the case shown in FIG. 1, there are problems in that the battery is not usable and an external power receiving device of the existing notebook computer must be changed. In the case shown in FIG. 2, it is inconvenient for a user.

Even though the fuel cell is suitable for supplying the power to the portable electronic device, if the existing portable electronic device changes its structure, there is an economical disadvantage. For example, a battery pack is provided to supply power to the existing notebook computer, and the notebook computer is internally provided with a power receiving device to convert, stabilize, and receive discharge power from the battery pack. Further, an external casing and an internal circuit of the notebook computer have a structure for the battery pack. In this state, to mount the fuel cell onto the notebook computer, if the external casing, a circuit board, and the internal power receiving device of the notebook computer need to be changed, a manufacturer of the notebook computer must accept an excessive increase in the production cost.

SUMMARY OF THE INVENTION

Accordingly, aspects of the present invention provide a battery pack or a power receiving device that allow an external electric generator to be used without changing the existing portable electronic device.

According to an aspect of the present invention, there is provided a battery pack including: a battery cell to discharge battery power based on a charged amount of electric charge; an external power input terminal to receive external power from an external power generator; a power output terminal to supply the battery power and the external power to an external load; and a voltage transforming circuit to transform a voltage of the external power received through the external power input terminal and to transfer the transformed voltage to the power output terminal.

According to another aspect of the present invention, there is provided a power receiving device provided inside an electronic device and receiving power needed for driving an internal circuit of the electronic device from the outside, the power receiving device including: a battery input terminal to receive battery power from a battery; an external power input terminal to receive external power from an external power generator; a power output terminal to supply the battery power and the external power to the internal circuit of the electronic device; and a voltage transforming circuit to transform a voltage of the external power received through the external power input terminal and to transfer the transformed voltage to the power output terminal.

The battery pack may further include a charging circuit to charge the battery cell with the external power received through the external power input terminal; and a controller to control operations for supplying the external power and the battery power to the external load and for charging the battery cell.

The power receiving device provided inside an electronic device and receiving power needed for driving an internal circuit of the electronic device from the outside may further include a charging circuit to convert the external power of the external power input terminal into a voltage adapted for charging the external battery and to supply the converted voltage to the battery charging terminal; and a controller to control operations for supplying the battery power and the external power to the internal circuit of the electronic device and for charging the battery cell.

According to another aspect of the present invention, there is provided a method of supplying, from a single device, battery power and external power in parallel to an external load, the method including: receiving the external power from an external power generator; transforming a voltage of the external power; and supplying the battery power and the transformed external power to the external load.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
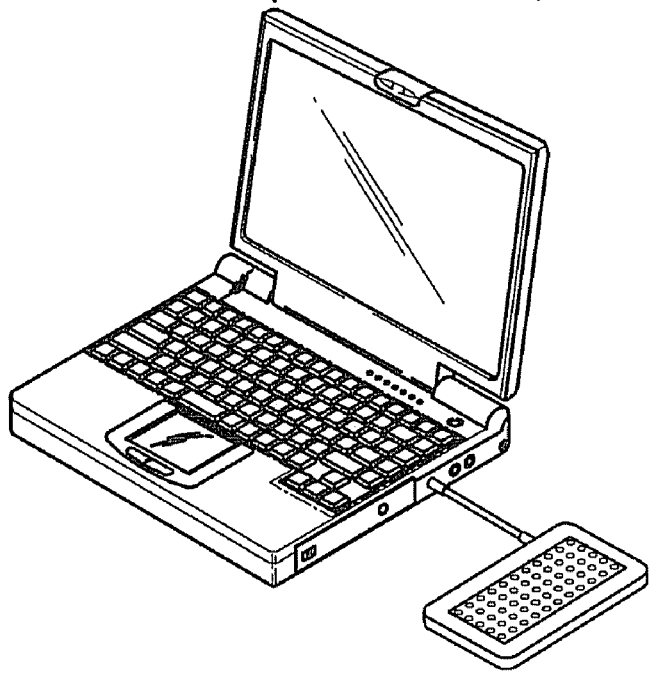
FIG. 1 is a perspective view showing an external power generator supplying power to a portable electronic device in the prior art.
Figure 2:
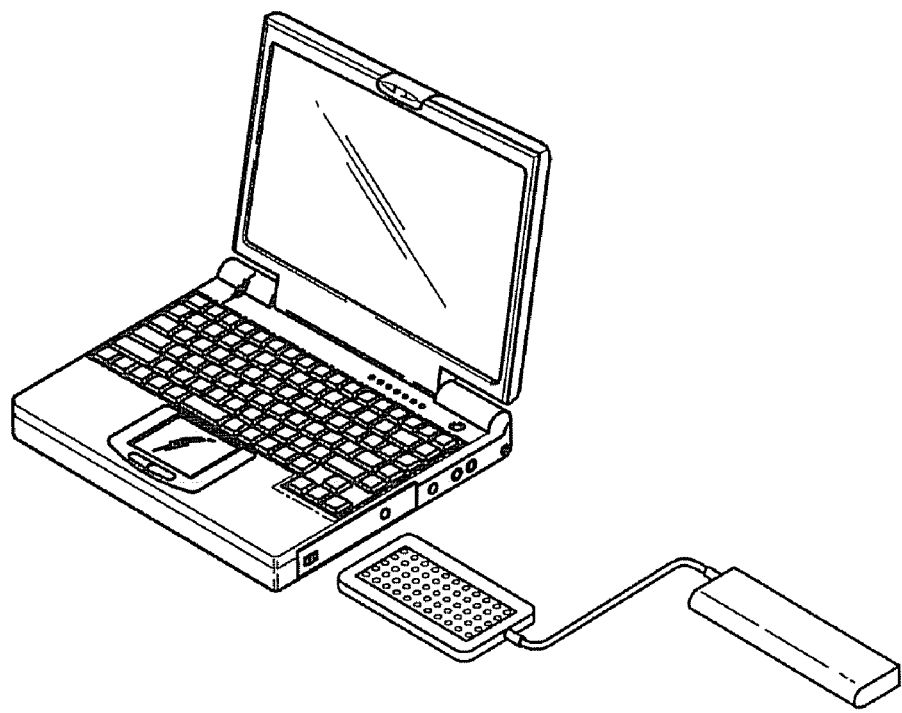
FIG. 2 is a perspective view showing an external power generator supplying charge power to a charger in the prior art.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Hereinafter, a notebook computer is described as an example of a portable electronic device to which a battery pack is mounted, and a fuel cell is described as an example of an external power generator. However, it is understood that aspects of the present invention may be applied to any portable electronic device and external power generators.

A battery pack, according to an embodiment of the present invention, supplies power generated in an external power generator (such as a fuel cell or the like) and power discharged from a battery cell to a portable electronic device without changing a structure of a portable electronic device (such as a notebook computer or the like).

Figure 4:
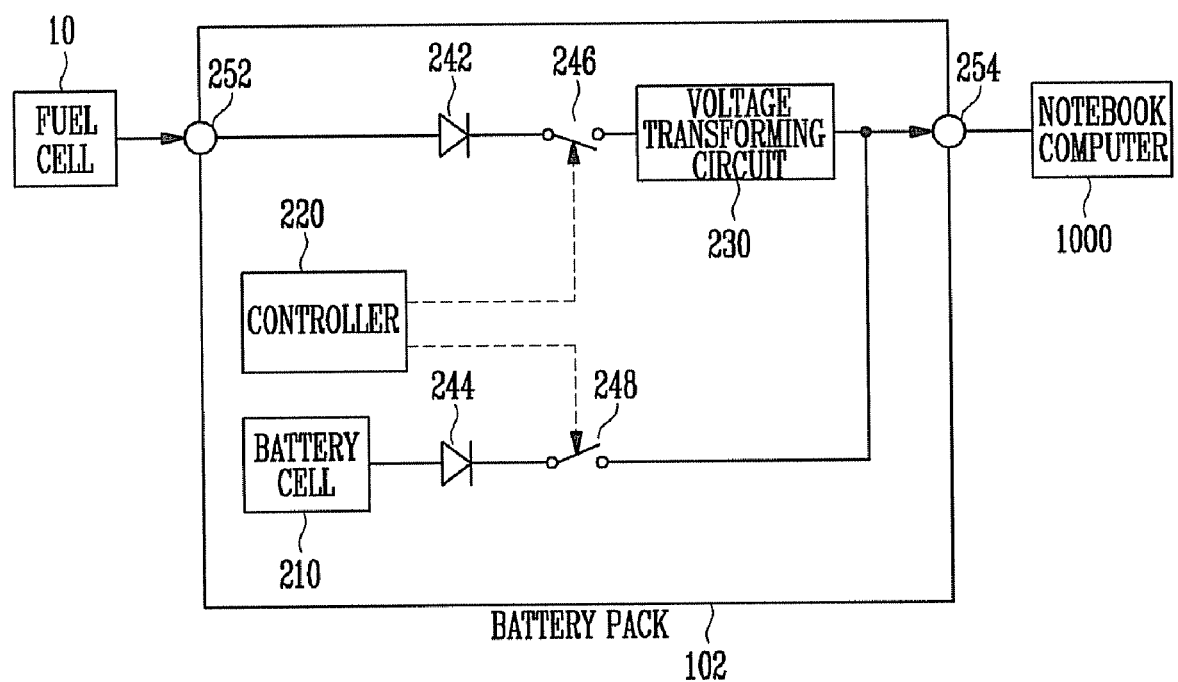
FIG. 4 is a block diagram of a battery pack according to an embodiment of the present invention.

As shown in FIG. 4, a battery pack 102 according to an embodiment of the present invention includes: a battery cell 210 to discharge power depending on a charged quantity of electric charge; an external power input terminal 252 to receive power from an external fuel cell 10; a power output terminal 254 to supply power to an external notebook computer 1000; and a voltage transforming circuit 230 to transform voltage of the power supplied from the external power input terminal 252 and to transfer the power to the power output terminal 254.

The battery cell 210 can be implemented by a lithium-ion or lithium-polymer secondary battery, which have been widely used in the conventional notebook computer. In this embodiment, the battery cell 210 is used together with the fuel cell 10 in supplying the power to the notebook computer, so that the capacity of the battery cell 210 can be reduced with respect to the conventional battery cell.

The external power input terminal 252 can be implemented by a terminal to receive the power generated in the external fuel cell 10. Here, the terminal is one of various standard terminals which are widely used for power input.

The power output terminal 254 can be implemented by a contact terminal or the like to be connected to a power input terminal of an external load such as the portable electronic device. For example, the power output terminal 254 can have the same shape as a power supply connection terminal for the battery pack of the conventional notebook computer.

The voltage transforming circuit 230 equalizes the voltage of the power received from the fuel cell 10 to the discharge voltage of the battery cell 210. In this embodiment, the output voltage of the battery cell 210 is transformed with respect to the voltage of the battery cell 210 and then supplied to the notebook computer 1000. This is because a built-in power receiving device of the conventional notebook computer is designed to receive the power according to voltages of the battery.

The voltage transforming circuit 230 can be implemented by a general boosting circuit that can continuously or stepwise change a boosting ratio according to an external control signal. Further, the voltage transforming circuit 230 can include a separate voltmeter that monitors the output voltage of the battery cell 210 in order to determine the boosting ratio. Also, the voltage transforming circuit 230 can boost the voltage up to a fixed output voltage if the battery cell 210 is disconnected from the power output terminal 254.

FIG. 4 illustrates a controller 220 and two routing switches 246 and 248. However, according to aspects of the present invention, the battery pack 102 may be provided without the controller 220 and the two routing switches 246 and 248 in, for example, a more simple and inexpensive configuration thereof. In this embodiment, if the fuel cell 10 is not physically connected to the external power input terminal 252, the voltage transforming circuit 230 stops operating even though there is no off-operation of a separate switch, and thus only the discharge power of the battery cell 210 is supplied to the notebook computer 1000, thereby securing a reasonable operation.

However, an external power routing switch 246 can be additionally provided to control a connection between the external power input terminal 252 and a power transforming circuit (such as the voltage transforming circuit 230) in order to disconnect the fuel cell 10 from the notebook computer 1000 depending on a control of the controller 220 when the fuel cell 10 is initialized.

Further, a battery routing switch 248 can be additionally provided to control a connection between the battery cell 210 and the power output terminal 254 in order to disconnect the notebook computer 1000 from the battery cell 210 and supply only the power generated in the fuel cell 10 to the notebook computer 1000 when the battery cell 210 is sufficiently discharged.

In this case, the controller 220 can be provided to control the switching operation of the external power routing switch 246 and/or the battery routing switch 248. Here, the controller 220 can be implemented by a micom such as a Z80, etc.

According to an aspect of the present invention, the controller 220 can have a passive control structure that switches the switches 246 and 248 on/off when an instruction signal is inputted by a user.

According to another aspect of the present invention, the controller 220 can have an active control structure whereby the controller has data that serves as a point of reference. For example, the controller 220 receives various parameters, such as a state of charge (SOC) of the battery cell 210, temperatures of the fuel cell 10 or the notebook computer 1000, etc. The data may include information about all or some voltages of the external power input terminal 252, the battery cell 210, and the power output terminal 254.

For convenience of a user, the controller 220 may be provided to monitor a voltage or the like in the external power input terminal 252 and determines whether or not the fuel cell 10 is connected and/or whether or not the fuel cell 10 is driven stably. Thus, the controller 220 controls the switches 246 and 248 accordingly such that if the fuel cell 10 is not connected or the fuel cell 10 is not driven stably, the fuel cell 10 is disconnected from the voltage transforming circuit 230 and the battery cell 210 is connected to the power output terminal 254.

Furthermore, the controller 220 can have a function to adjust a transform ratio of the voltage transforming circuit 230. Also, the controller 220 can have a function to cut off the external power input terminal 252, so that the fuel cell 10 is prevented from being connected to the load until the fuel cell 10 is stabilized at an initial operation, thereby enhancing the durability of the fuel cell 10.

The battery pack 102 includes a first inverse current cut-off element 242 to cut off an inverse current flowing from the power output terminal 254 to the fuel cell 10 through the external power input terminal 252, and a second inverse current cut-off element 244 to cut off an inverse current flowing from the power output terminal 254 to the battery cell 210. Here, the first and second inverse current cut-off elements 242 and 244 can be implemented by diodes.

Figure 3:
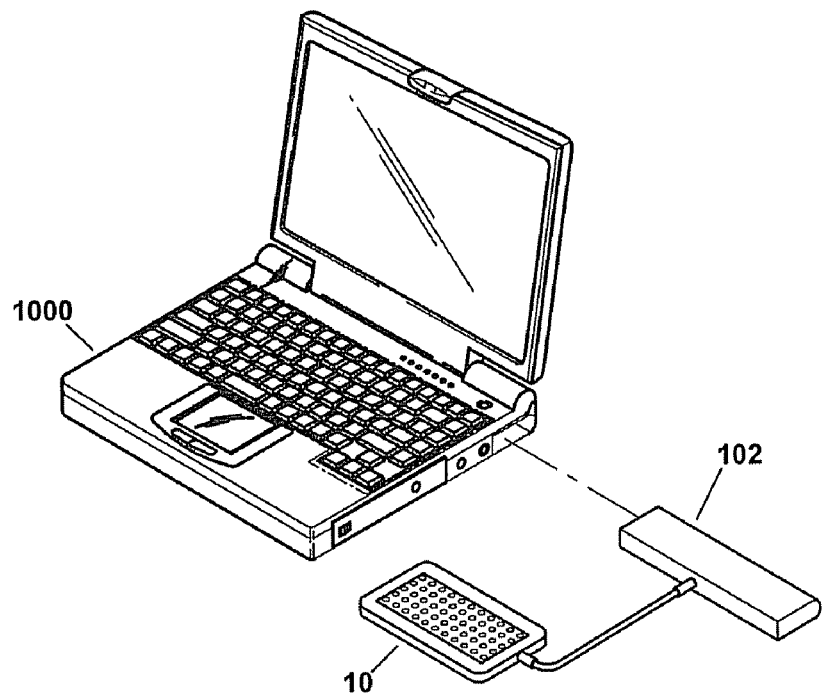
FIG. 3 is a perspective view showing a portable electronic device that receives power from a battery pack according to an embodiment of the present invention.

FIG. 3 illustrates the battery pack 102, according to an embodiment of the present invention, connected to the notebook computer 1000. Although the battery pack 102 is illustrated as separate from the notebook computer, it is understood that the battery back 102 may be actually mounted inside of the notebook computer 1000.

As shown in FIGS. 3 and 4, a casing of the battery pack 102 according to an embodiment of the present invention has approximately the same shape as that of the conventional battery pack used in the conventional notebook computer, except that the external power input terminal 252 is placed on the outside to allow a connection to the external power generator while the battery pack 102 is mounted to the notebook computer 1000.

The voltage transforming circuit 230 equalizes the voltages between the fuel cell 10 and the battery cell 210 at a point where they are connected, thereby preventing the current from flowing therebetween. Therefore, even though the battery cell 210 is discharged and lowered in voltage, the battery cell 210 together with the fuel cell 10 can supply the power to the notebook computer for a relatively long time as they are connected in parallel.

According to an embodiment of the present invention, from a perspective of the power output terminal 254 to which the notebook computer 1000 is connected, the fuel cell 10 and the battery cell 210 are a power source in which they are connected in parallel. Thus, the fuel cell 10 and the battery cell 210 discharge and supply the power at a predetermined current ratio at the same time to the notebook computer 1000.

The discharge current ratio may be changed to gradually increase the current of the fuel cell 10 as the battery cell 210 becomes discharged.

If the power consumption of the notebook computer is suddenly increased, the fuel cell 10 cannot rapidly increase an output current but the battery cell 210 can rapidly increase the discharge current in accordance with the increased power consumption of the notebook computer. Thus, even when the necessary power of the notebook computer 1000 is suddenly increased, the fuel cell 10 can supply the power stably without suddenly changing the state thereof, so that the stable and the effective operation of the fuel cell 10 is secured.

According to another embodiment of the present invention, a battery pack has the same configuration as that illustrated in FIG. 4 in order to supply discharge power from an internal battery cell and power generated in an external power generator (such as a fuel cell) to an external load (such as a notebook computer), and additionally charges the internal battery cell with the power generated in the external power generator.

Figure 5:
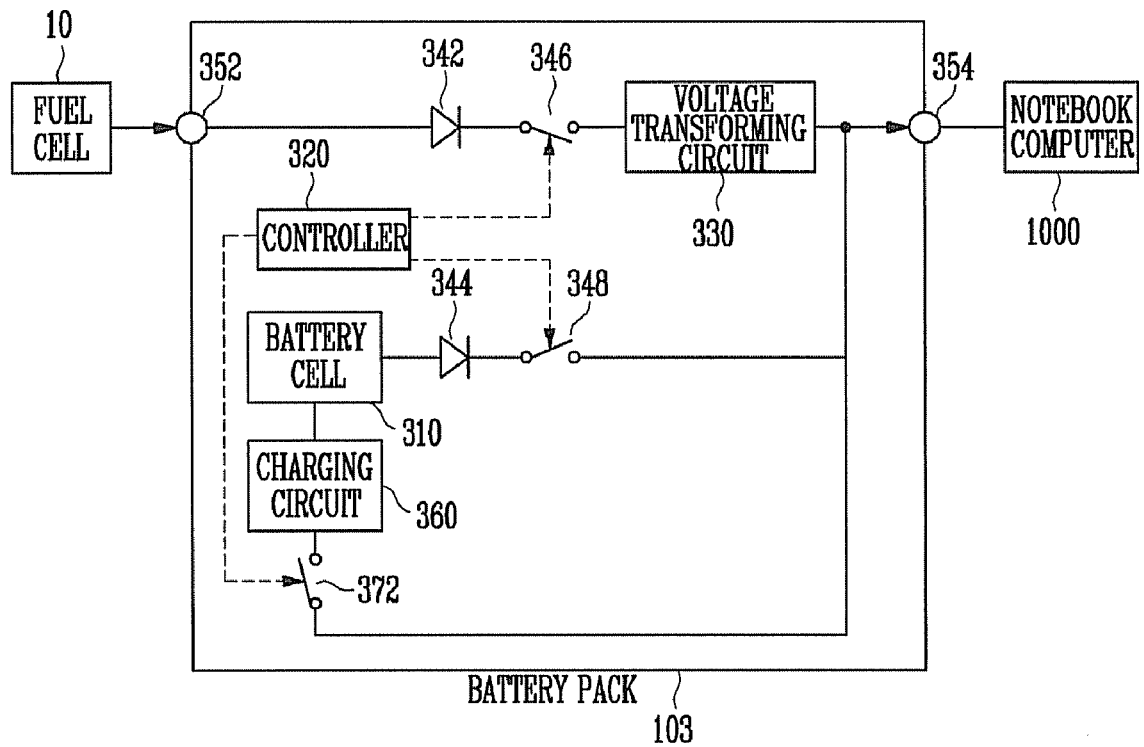
FIG. 5 is a block diagram of a battery pack according to another embodiment of the present invention.

As shown in FIG. 5, a battery pack 103 according to another embodiment of the present invention includes a battery cell 310 to discharge power depending on a charged quantity of electric charge; an external power input terminal 352 to receive power from an external fuel cell 10; a power output terminal 354 to supply power to an external notebook computer 1000; a voltage transforming circuit 330 to transform voltage of the power supplied through the external power input terminal 352 and to transfer the power to the power output terminal 354; a charging circuit 360 to charge the battery cell 310 with the power received through the external power input terminal 352; and a controller 320 to control an operation for supplying power to the notebook computer 1000 and an operation for charging the battery cell 310.

Further, the battery pack 103 may include an external power routing switch 346 to control a connection between the external power input terminal 352 and a power transforming circuit (such as the voltage transforming circuit 330) in order to disconnect the fuel cell 10 from the notebook computer 1000 depending on a control of the controller 320 when the fuel cell 10 is initialized.

Also, the battery pack 103 may additionally include a battery routing switch 348 to control a connection between the battery cell 310 and the power output terminal 354 in order to disconnect the notebook computer 1000 from the battery cell 310 and supply only the power generated in the fuel cell 10 to the notebook computer when the battery cell 310 is sufficiently discharged.

In this case, the controller 320 can be provided to control the switching operation of the external power routing switch 346 and/or the battery routing switch 348.

Further, the battery pack 103 includes a first inverse current cut-off element 342 to cut off an inverse current flowing from the power output terminal 354 to the fuel cell 10 through the external power input terminal 352, and a second inverse current cut-off element 344 to cut off an inverse current flowing from the power output terminal 354 to the battery cell 310.

The functionalities of the components shown in FIG. 5 are generally the same as those of the embodiment shown in FIG. 4 except for a function of charging the battery cell 310, and thus repetitive descriptions will be avoided as necessary. Below, the function of charging the battery cell 310 will be described.

The charging circuit 360 entirely or partially converts the power received from the external fuel cell 10 into a charge voltage, and supplies the charge voltage to a charging node of the battery cell 310. With the power received from the external fuel cell 10, to make a constant power ratio between the power to be supplied to the notebook computer 1000 and the power to be charged in the battery cell 310, the input impedance of the charging circuit 360 may be determined to have a predetermined ratio corresponding to the constant power ratio with respect to the input impedance of the notebook computer 1000. In FIG. 5, a charging switch 372 controls a connection between a power input route from the external power input terminal 352 and the charging circuit 360. Furthermore, the shown charging circuit 360 has an input terminal connected to an output terminal of the voltage transforming circuit 330, thereby advantageously receiving the power stabilized by the voltage transforming circuit, but not limited thereto. Alternatively, the input terminal of the charging circuit 360 may be connected to an input terminal or a previous terminal of the voltage transforming circuit 330. In this case, the stabilization is decreased, though an average voltage level is invariable.

The controller 320 can be implemented by a micom such as a Z80, etc. Here, the controller 320 switches the charging switch 372 on/off to control the connection between the charging circuit 360 and a power supplying line of the fuel cell 10, and switches the battery routing switch 348 on/off to control an output line of the battery cell 310.

The controller 320 determines a charging/discharging mode of the battery cell 310. Further, the controller 320 can have a function to adjust a transform ratio of the voltage transforming circuit 330. Also, the controller 320 can have a function to control the external power routing switch 346 in order to cut off the external power input terminal 352, so that the fuel cell 10 is prevented from being connected to the load until the fuel cell 10 is stabilized at an initial operation, thereby enhancing the durability of the fuel cell 10.

Like the embodiment described with reference to FIG. 4, the controller 320 can have a passive control structure or an active control structure.

To give the controller 320 the active control structure, the controller 320 may have data that serves as a point of reference. For example, the controller 320 receives various parameters such as a state of charge (SOC) of the battery cell 310, temperatures of the fuel cell 10 or the notebook computer 1000, etc. The data may include information about all or some voltages of the external power input terminal 352, the battery cell 310 and the power output terminal 354.

Operations of receiving an output voltage of the battery cell 310 and controlling the battery cell 310 to be charged are as follows. When the controller 320 determines that the output voltage of the battery cell 310 is lower than a charging start reference level, the controller 320 switches off the battery routing switch 348 and switches on the charging switch 372, thereby starting a charging of the battery cell 310. After starting the charging of the battery cell 310, if the output voltage of the battery cell 310 is boosted up to a charging stop reference level, the controller 320 switches on the battery routing switch 348 and switches off the charging switch 372, thereby stopping the charging the battery cell 310 and starting the discharge.

According to the embodiment of the present invention illustrated in FIG. 5, the fuel cell 10 is not separately treated regardless of whether the battery cell 310 is charged or discharged. A fuel cell 10 that has a function of operating to generate a proper amount of power by determining the capacity of the load is expensive. On the other hand, if the fuel cell 10 operates to generate a fixed amount of power, problems may arise in stably supplying the power to the notebook computer 1000 and the durability of the fuel cell 10.

Therefore, according to yet another embodiment of the present invention, the external fuel cell 10 operates in two driving modes, so that the fuel cell 10 operates in a high power generating mode while the battery cell is charged and in a low power generating mode while the battery cell is discharged.

Figure 6:
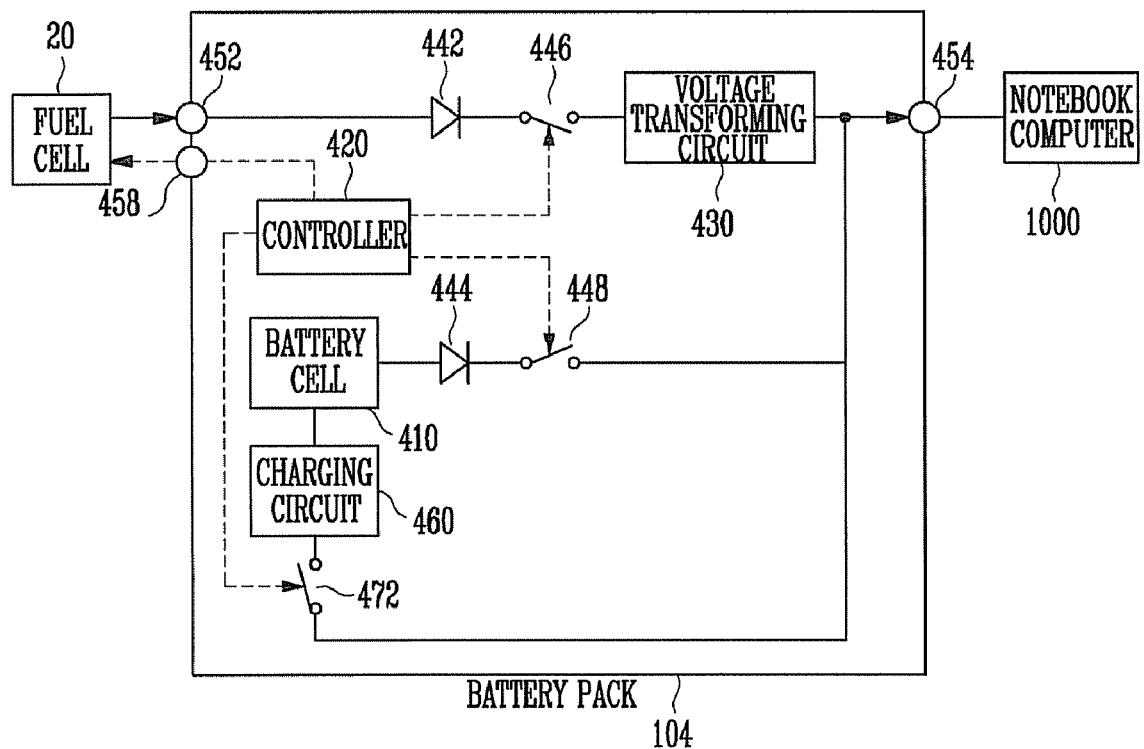
FIG. 6 is a block diagram of a battery pack according to yet another embodiment of the present invention.

As shown in FIG. 6, the battery pack 104 having a structure to be used together with the external fuel cell 10 having the two driving modes that generate different amounts of power includes the same configurations as the embodiment described with reference to FIG. 5. Additionally, the battery pack 104 includes a power generation control signal output terminal 458 to transmit a driving control signal (such as a mode signal generated by a controller 420) to the external power generator (such as a fuel cell 10 or the like).

The components of the battery pack 104 shown in FIG. 6, except the controller 420 and the power generation control signal output terminal 458, are approximately the same as those described with reference to FIG. 5. Therefore, repetitive descriptions will be avoided as necessary.

Figure 10:
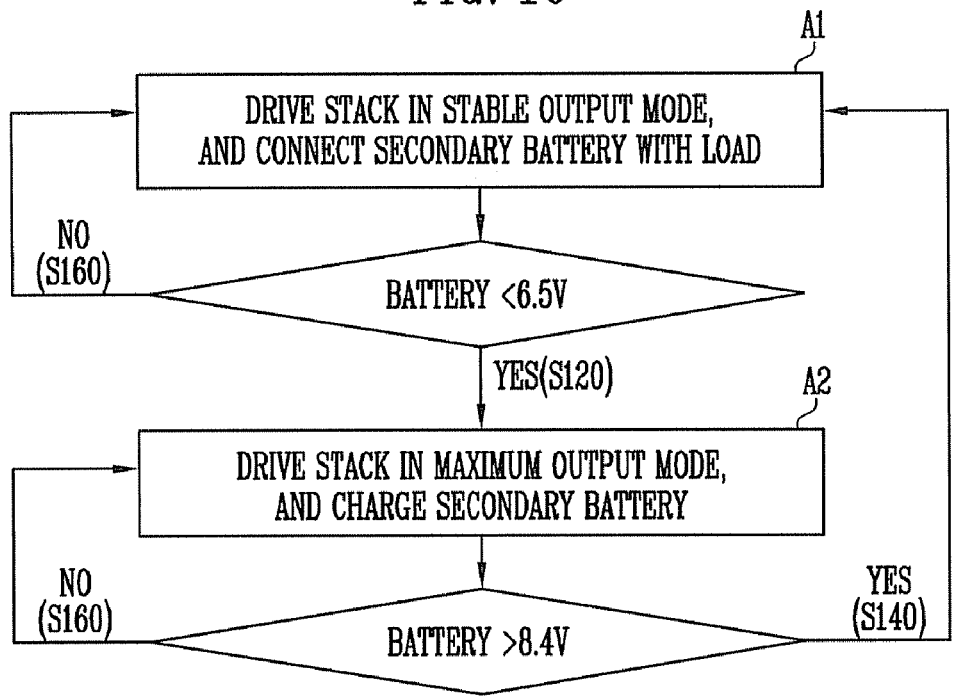
FIG. 10 is a flowchart of a charging method using a fuel cell that operates in two driving modes according to an embodiment of the present invention.

FIG. 10 illustrates a flowchart of a charging method using the fuel cell 20 that operates in two driving modes, as illustrated in FIG. 6, such that the controller 420 controls a charge amount of a battery cell 410 according to measured results and charges the battery cell 410 with the power generated in the fuel cell 20. Referring to FIG. 10, if the measured charge amount is lower than a predetermined first reference level, the fuel cell 20 is driven in a maximum output mode and charges the battery cell 410 while, at the same time, supplying the generated power to the notebook computer 1000 (operation S120). If the measured charge amount is higher than a predetermined second reference level, the fuel cell 20 is driven in a stable output mode and supplies the generated power together with the discharge power of the battery cell 410 to the notebook computer 1000 (operation S140). If the measured charge amount is higher than the first reference level and is lower than the second reference level, the fuel cell 20 is maintained at a previous driving mode (operation S160).

According to the charging method shown in FIG. 10, the driving modes of the fuel cell 20 are embodied in a normal output of 30 W and a maximum output of 40 W. However, they are not limited thereto and may be varied. Further, output terminal voltage levels of the secondary battery are embodied in a first reference level of 6.5V and a second reference level of 8.4V. However, they are not limited thereto and may be varied. As a parameter for obtaining the charge amount of the secondary battery, the SOC of the secondary battery can be used as well as the output terminal voltage levels of the secondary battery.

In the driving control method according to aspects of the present invention, the fuel cell 20 operates in one of the following two driving modes. In a first mode A1, the fuel cell 20 operates in the stable output mode of generating relatively low power, and the output lines of the battery cell 410 and the fuel cell 20 are connected in parallel and supply the power to the load. In a second mode A2, the fuel cell 20 operates in the maximum output mode of generating relatively high power, and some of the power generated in the fuel cell 20 is supplied to the load and the remaining power is used in charging the battery cell 410.

Logically, one reference level is enough to determine one of two driving modes. However, two reference levels may be employed to determine one of two driving modes. In a fuel cell system, if a switching state of a switch is altered according to the driving modes, and if the driving mode is so frequently changed due to a difference in a fuel supplying amount or the like, the durability of the fuel cell system deteriorates. Accordingly, aspects of the present invention may employ two reference levels in determining the driving mode of the external fuel cell 20, and the changed driving mode is maintained for a predetermined time.

Figure 7:
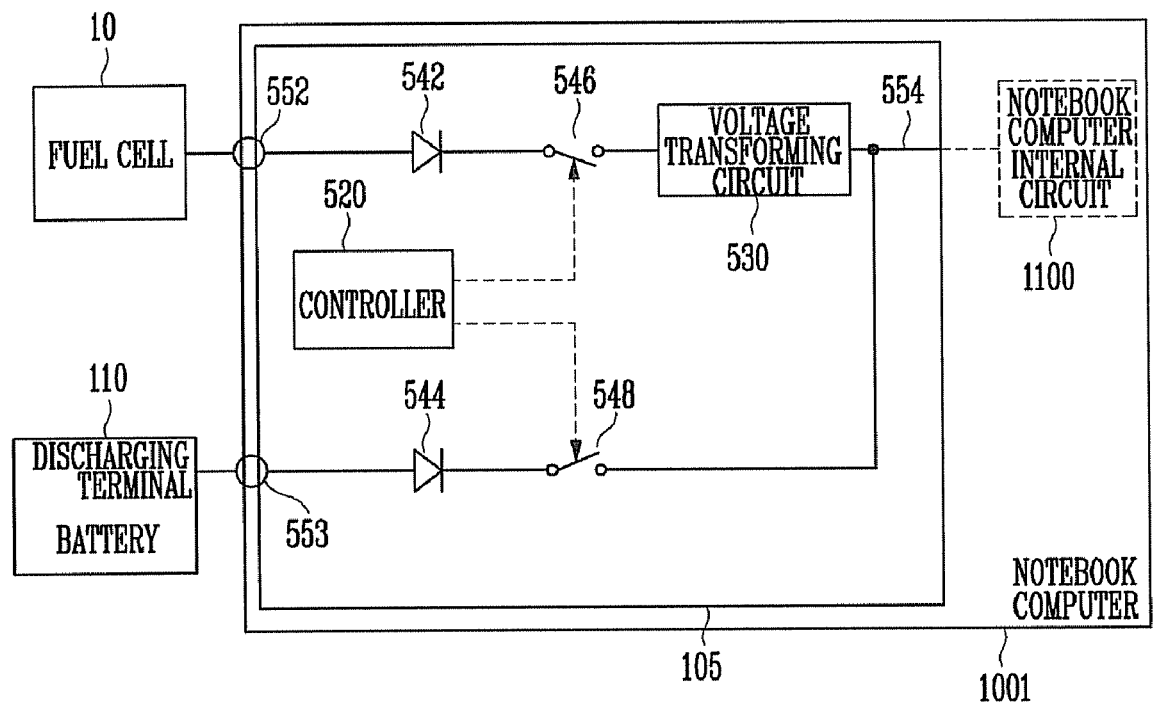
FIG. 7 is a block diagram of a power receiving device according to an embodiment of the present invention.

FIG. 7 illustrates a block diagram of a power receiving device 105 according to an embodiment of the present invention. As shown in FIG. 7, an external power receiving device 105 includes an external battery input terminal 553 to receive discharge power from an external battery 110; an external power input terminal 552 to receive power from the external fuel cell 10; a power output line 554 to supply power to an internal circuit 1100 of the notebook computer 1001; and a voltage transforming circuit 530 to transform the voltage of the power received through the external power input terminal 552 and transfer the power to the power output line 554.

The external battery input terminal 553 can be implemented by a terminal that can be connected to a discharge terminal of a battery pack 110 in order to receive power from, for example, a lithium-ion or lithium-polymer secondary battery (both of which have been widely used in the conventional notebook computer).

The external power input terminal 552 can be implemented by a terminal to receive the power generated in the external fuel cell 10. Here, the terminal may be one of various standard terminals which are widely used for power input.

The voltage transforming circuit 530 equalizes the voltage of the power received from the fuel cell 10 to the discharge voltage of the external battery 110. According to an aspect of the present invention, the output voltage of the external battery 110 is transformed with respect to the voltage of the external battery 110 and then supplied to the notebook computer 1001. This is because a built-in power receiving device of the conventional notebook computer 1001 is designed to receive the power according to voltages of the battery.

The voltage transforming circuit 530 can be implemented by a general boosting circuit that can continuously or stepwise change a boosting ratio according to an external control signal. Further, the voltage transforming circuit 530 can include a separate voltmeter that monitors the voltage of the external battery input terminal 553 in order to determine the boosting ratio. Also, the voltage transforming circuit 530 can boost the voltage up to a fixed output voltage if the external battery cell 110 is disconnected from the power output line 554.

The power receiving device 105 further includes a first inverse current cut-off element 542 to cut off an inverse current flowing from the internal circuit 1100 of the notebook computer 1000 to the fuel cell 10 through the external power input terminal 552, and a second inverse current cut-off element 544 to cut off an inverse current flowing from the internal circuit 1100 of the notebook computer 1000 to the external battery 110. Here, the first and second inverse current cut-off elements 542 and 544 can be implemented by diodes.

FIG. 7 illustrates a controller 520 and two routing switches 546 and 548. However, it is understood that the power receiving device 105 may be provided without the controller 520 and the two routing switches 546 and 548 in, for example, a more simple and inexpensive configuration thereof. Accordingly, if the fuel cell 10 is not physically connected to the external power input terminal 552, the voltage transforming circuit 530 stops operating even though there is no off-operation of a separate switch, and thus only the discharge power of the external battery 110 is supplied to the notebook computer 1001, thereby securing a reasonable operation.

However, an external power routing switch 546 can be additionally provided to control a connection between the external power input terminal 552 and a power transforming circuit (such as the voltage transforming circuit 530) in order to disconnect the fuel cell 10 from the notebook computer 1001 depending on a control of the controller 520 when the fuel cell 10 is initialized.

Furthermore, a battery routing switch 548 can be additionally provided to control a connection between the battery 110 and the power output line 554 in order to disconnect the notebook computer 1001 from the external battery cell 110 and supply only the power generated in the fuel cell 10 to the notebook computer 1001 when the external battery 110 is sufficiently discharged.

In this case, the controller 520 can be provided to control the switching operation of the external power routing switch 546 and/or the battery routing switch 548. Here, the controller 520 can be implemented by a micom, such as a Z80, etc. The controller 520 can have a passive control structure that switches the switches 546 and 548 on/off when an instruction signal is inputted by a user.

To give the controller 520 an active control structure, the controller 520 may have data that serves as a point of reference. For example, the controller 520 receives various parameters such as an SOC of the external battery cell 110, temperatures of the fuel cell or the notebook computer 1001, etc. The data may include information about all or some voltages of the external power input terminal 552, the battery 110, and the power output line 554.

The controller 520 may monitor a voltage or the like in the external power input terminal 552 and determine whether the fuel cell 10 is connected and/or whether the fuel cell 10 is driven stably. Thus, the controller 520 controls the switches 546 and 548 accordingly such that if the fuel cell 10 is not connected or the fuel cell 10 is not driven stably, the fuel cell 10 is disconnected from the voltage transforming circuit 530 and the battery 110 is connected to the power output line 554.

Further, the controller 520 can have a function to adjust a transform ratio of the voltage transforming circuit 530. Also, the controller 520 can have a function to cut off the external power input terminal 552, so that the fuel cell 10 is prevented from being connected to the load until the fuel cell 10 is stabilized at an initial operation, thereby enhancing the durability of the fuel cell 10.

A method and a principle of supplying both the power from the external fuel cell 10 and the discharge power from the battery cell 110 to the external notebook computer 1001 in parallel will now be described. The voltage transforming circuit 530 equalizes the voltages between the fuel cell 10 and the battery 110 at a point where they are connected, thereby preventing the current from flowing therebetween. Therefore, even though the battery 110 is discharged and lowered in voltage, the battery cell 210 together with the fuel cell 10 can supply the power to the notebook computer 1001 for a relatively long time as they are connected in parallel.

From a perspective of the power output line 554 to which the internal circuit 1100 of the notebook computer 1001 is connected, the fuel cell 10 and the battery 110 look like a power source in which they are connected in parallel. Thus, the fuel cell 10 and the battery 110 discharge and supply the power at a predetermined current ratio at the same time to the notebook computer 1001. The discharge current ratio may be changed to gradually increase the current of the fuel cell 10 as the battery 110 becomes discharged.

If the power consumption of the notebook computer 1001 is suddenly increased, the fuel cell 10 cannot rapidly increase an output current but the battery 110 can rapidly increase the discharge current in accordance with the increased power consumption in the internal circuit 1100 of the notebook computer 1001. Thus, even when the necessary power in the internal circuit 1100 of the notebook computer 1001 is suddenly increased, the fuel cell 10 can supply the power stably without suddenly changing the state thereof, so that the stable and the effective operation of the fuel cell 10 are secured.

Figure 8:
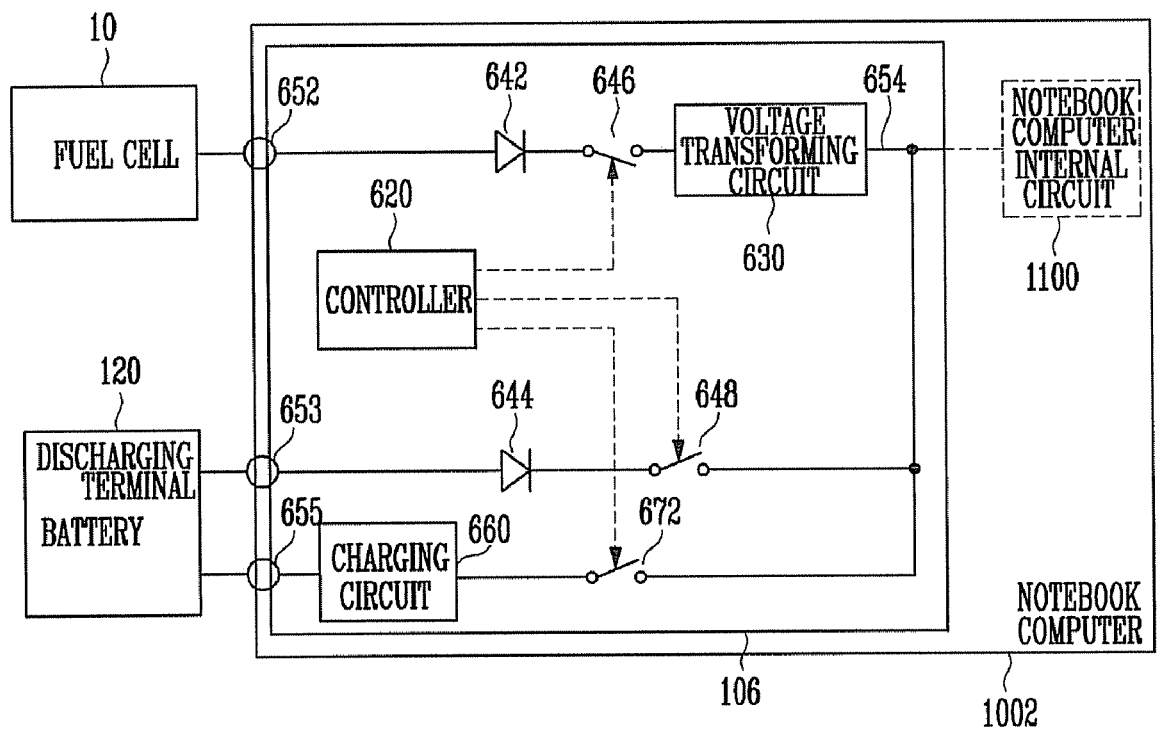
FIG. 8 is a block diagram of a power receiving device according to another embodiment of the present invention.

FIG. 8 illustrates a block diagram of a power receiving device 106 according to another embodiment of the present invention. The power receiving device 106 of the present embodiment includes the same configuration as the embodiment illustrated in FIG. 7 to supply discharge power from an external battery 110 and power generated in an external power generator such as a fuel cell 10 or the like to an external load such as a notebook computer 1001. The power receiving device 106 illustrated in FIG. 8 additionally includes a configuration to charge the external battery 110 with the power generated in the external power generator 10.

As shown in FIG. 8, the power receiving device 106 includes an external battery input terminal 653 to receive discharge power from an external battery 120; an external power input terminal 652 to receive power from an external fuel cell 10; a power output terminal 654 to supply power to an internal circuit 1100 of a notebook computer 1002; a voltage transforming circuit 630 to transform voltage of the power supplied through the external power input terminal 652 and to transfer the power to the power output terminal 654; a battery charging terminal 655 to supply charge power to the external battery 120; a charging circuit 660 to convert voltage of the power at the external power input terminal 652 into a charge voltage and to transfer the charge voltage to the battery charging terminal 655 so as to charge the external battery 120; and a controller 620 to control an operation for supplying power to the internal circuit 1100 of the notebook computer 1002 and an operation for charging the external battery 120.

Further, the power receiving device 106 can include an external power routing switch 646 to control a connection between the external power input terminal 652 and the power transforming circuit 630 in order to disconnect the fuel cell 10 from the load depending on a control of the controller 620 when the fuel cell 10 is initialized.

Also, the power receiving device 106 can additionally include a battery routing switch 648 to control a connection between the battery 120 and the power output terminal 654 in order to disconnect the notebook computer 1002 from the battery 120 and supply only the power generated in the fuel cell 10 to the notebook computer 1002 when the battery 120 is sufficiently discharged.

In this case, the controller 620 can be provided to control the switching operation of the external power routing switch 646 and/or the battery routing switch 648.

Further, the power receiving device 106 may include a first inverse current cut-off element 642 to cut off an inverse current flowing from the internal circuit 1100 of the notebook computer 1002 to the fuel cell 10 through the external power input terminal 652, and a second inverse current cut-off element 644 to cut off an inverse current flowing from the internal circuit 1100 of the notebook computer 1002 to the battery 120.

The functionalities of the components shown in FIG. 8 are generally the same as those of the embodiment shown in FIG. 7 except for a function of charging the battery 120, and thus repetitive descriptions will be avoided as necessary. Below, the function of charging the battery 120 will be described.

The charging circuit 660 entirely or partially converts the power received from the external fuel cell 10 into a charge voltage, and supplies the charge voltage to a charging terminal of the battery 120. With the power received from the external fuel cell 10, to make a constant power ratio between the power to be supplied to the internal circuit 1100 of the notebook computer 1002 and the power to be charged in the battery 120, the input impedance of the charging circuit 660 may be determined to have a predetermined ratio corresponding to the constant power ratio with respect to the input impedance of the internal circuit 1100 of the notebook computer 1002. In FIG. 8, a charging switch 672 controls a connection between a power input route from the external power input terminal 652 and the charging circuit 660. Furthermore, the shown charging circuit 660 has an input terminal connected to an output terminal of the voltage transforming circuit 630, thereby advantageously receiving the power stabilized by the voltage transforming circuit, but not limited thereto. Alternatively, the input terminal of the charging circuit 660 may be connected to an input terminal or a previous terminal of the voltage transforming circuit 630. In this case, the stabilization is decreased, though an average voltage level is invariable.

The controller 620 can be implemented by a micom such as a Z80, etc. Here, the controller 620 switches the charging switch 672 on/off to control the connection between the charging circuit 660 and a power supplying line of the fuel cell 10, and switches the battery routing switch 648 on/off to control an output line of the battery 120.

The controller 620 determines a charging/discharging mode of the battery 120. Further, the controller 620 can have a function to adjust a transform ratio of the voltage transforming circuit 630. Also, the controller 620 can have a function to control the external power routing switch 646 in order to cut off the external power input terminal 652, so that the fuel cell 10 is prevented from being connected to the load until the fuel cell 10 is stabilized at an initial operation, thereby enhancing the durability of the fuel cell 10.

The controller 620 can have a passive control structure or an active control structure. To give the controller 620 the active control structure, the controller 620 may have data that serves as a point of reference. For example, the controller 620 receives various parameters such as a state of charge (SOC) of the battery 120, temperatures of the fuel cell 10 or the internal circuit 1100 of the notebook computer 1002, etc. The data may include information about all or some voltages of the external power input terminal 652, the battery 120, and the power output terminal 654.

Here, operations of receiving the voltage of the external battery input terminal 653 and controlling the battery 120 to be charged are as follows. When the controller 620 determines that the voltage of the external battery input terminal 653 is lower than a charging start reference level, the controller 620 switches off the battery routing switch 648 and switches on the charging switch 672, thereby starting a charging of the battery 120. After starting the charging of the battery 120, if the voltage of the external battery input terminal 653 is boosted up to a charging stop reference level, the controller 620 switches on the battery routing switch 648 and switches off the charging switch 672, thereby stopping the charging of the battery 120 and starting the discharge.

According to the embodiment of the present invention illustrated in FIG. 8, the fuel cell 10 is not separately treated regardless of whether the battery 120 is charged or discharged. A fuel cell 10 that has a function of operating to generate a proper amount of power by determining the capacity of the load is expensive. On the other hand, if the fuel cell 10 operates to generate a fixed amount of power, problems may arise in stably supplying the power to the notebook computer 1002 and the durability of the fuel cell 10.

Therefore, the external fuel cell 10 may operate in two driving modes, so that the fuel cell 10 operates in a high power generating mode while the battery 120 is charged and in a low power generating mode while the battery is discharged.

Figure 9:
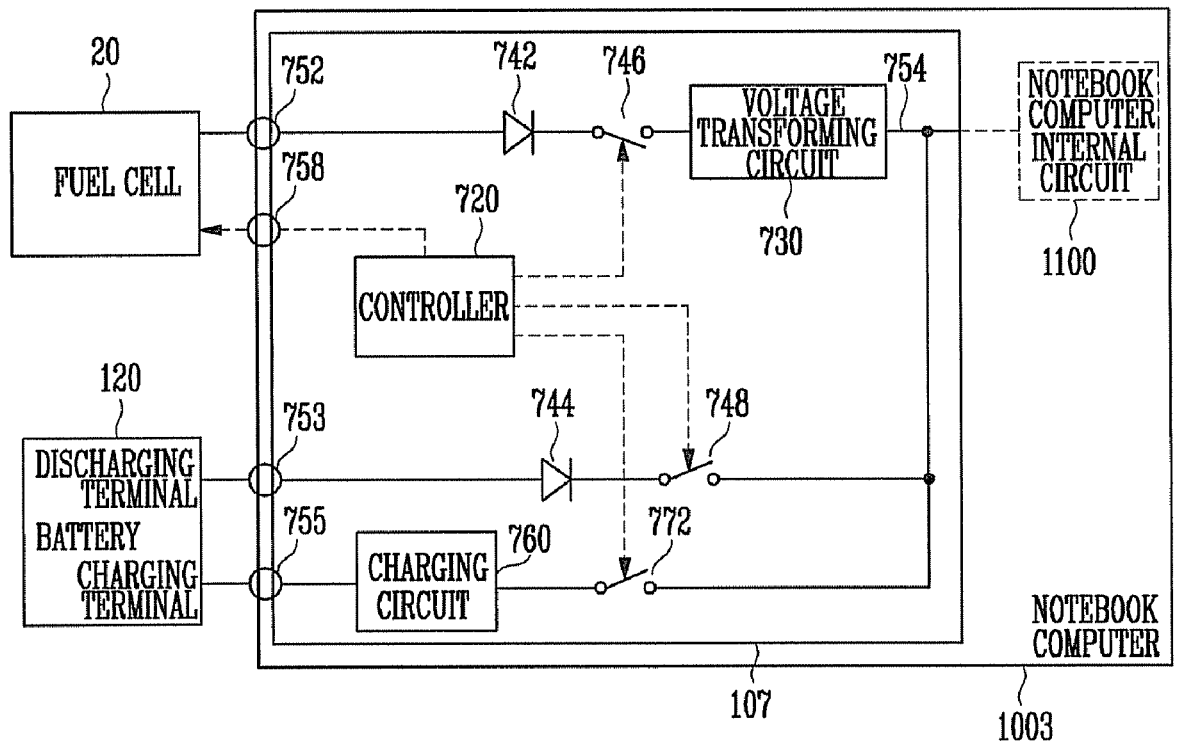
FIG. 9 is a block diagram of a power receiving device according to yet another embodiment of the present invention.

FIG. 9 illustrates a block diagram of a power receiving device 107 according to yet another embodiment of the present invention. Referring to FIG. 9, the power receiving device 107 has a structure to be used together with the external fuel cell 20 having two driving modes generating different amounts of power. For this, as shown in FIG. 9, the power receiving device 107 has the same configurations as that of the power receiving device 106 illustrated in FIG. 8, and additionally includes a power generation control signal output terminal 758 to transmit a driving control signal such as a mode signal generated by a controller 720 to the external power generator (such as a fuel cell 20 or the like).

The components of the power receiving device 107 shown in FIG. 9 are approximately the same as those of the embodiment illustrated in FIG. 8 except for the controller 720 and the power generation control signal output terminal 758. Therefore, repetitive descriptions will be avoided as necessary.

The controller 720 of the present embodiment uses the same charging method as shown in FIG. 10. The charging method of FIG. 10 was already described while explaining the embodiment illustrated in FIG. 6, and a repetitive description will be omitted.

Using the battery pack according to aspects of the present invention, an external power generator (such as the fuel cell or the like) can be applied to existing portable electronic devices without changing the existing portable electronic device. Further, using the power receiving device according to aspects of the present invention, the external power generator (such as the fuel cell or the like) can be applied to the existing portable electronic device with a minimum change in the structure of the existing portable electronic device.

According to aspects of the present invention, the battery pack and the power receiving device can inexpensively and stably supply the power to the electronic device.

Furthermore, according to aspects of the present invention, in the case where the fuel cell is used as the external power generator, the battery pack and the power receiving device can supply the power stably without damaging the fuel cell even though the load capacity of the electronic device is suddenly varied.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
    a battery cell to discharge battery power based on a charged amount of electric charge;
    an external power input terminal to receive external power from an external power generator;
    a power output terminal to supply the battery power and the external power to an external load; and
    a voltage transforming circuit to transform a voltage of the external power and to transfer the transformed voltage to the power output terminal.

2. The battery pack as claimed in claim 1, wherein the voltage transforming circuit equalizes the voltage of the external power to a voltage of the battery power.

3. The battery pack as claimed in claim 1, wherein the voltage transforming circuit boosts the voltage of the external power to a fixed output voltage if the battery power is not supplied to the power output terminal.

4. The battery pack as claimed in claim 1, wherein the voltage transforming circuit boosts the voltage of the external power according to a voltage of the battery power.

5. The battery pack as claimed in claim 1, further comprising:
    an external power routing switch to control a connection between the external power input terminal and the voltage transforming circuit; and
    a controller to switch the external power routing switch between an on position connecting the external power input terminal and the voltage transforming circuit and an off position disconnecting the external power input terminal and the voltage transforming circuit.

6. The battery pack as claimed in claim 1, further comprising:
    a battery routing switch to control a connection between the battery cell and the power output terminal; and
    a controller to switch the battery routing switch between an on position connecting the battery cell and the power output terminal and an off position disconnecting the battery cell and the voltage power output terminal.

7. The battery pack as claimed in claim 1, further comprising:
    a first inverse current cut-off element to cut off an inverse current flowing from the power output terminal to the battery cell.

8. The battery pack as claimed in claim 7, further comprising:
    a second inverse current cut-off element to cut off an inverse current flowing from the power output terminal to the external power input terminal.

9. The battery pack as claimed in claim 1, further comprising:
    a charging circuit to charge the battery cell with the external power; and
    a controller to control operations for supplying the external power and the battery power to the external load and for charging the battery cell.

10. The battery pack as claimed in claim 9, further comprising:
    a charging switch to control a connection between the power output terminal and the charging circuit.

11. The battery pack as claimed in claim 9, further comprising:
    an external power routing switch to control a connection between the external power input terminal and the voltage transforming circuit.

12. The battery pack as claimed in claim 9, further comprising:
    a battery routing switch to control a connection between the battery cell and the power output terminal.

13. The battery pack as claimed in claim 9, further comprising:
    a first inverse current cut-off element to cut off an inverse current flowing from the power output terminal to the battery cell.

14. The battery pack as claimed in claim 13, further comprising:
    a second inverse current cut-off element to cut off an inverse current flowing from the power output terminal to the external power input terminal.

15. The battery pack as claimed in claim 9, wherein the charging circuit receives the external power through the voltage transforming circuit.

16. The battery pack as claimed in claim 9, wherein the charging circuit receives the external power directly from the external power input terminal.

17. The battery pack as claimed in claim 9, further comprising a power generation control signal output terminal to transmit a driving control signal to the external power generator.

18. The battery pack as claimed in claim 17, wherein the power generation control signal output terminal transmits a first driving control signal controlling the external power generator to output a first amount of the external power or a second driving control signal controlling the external power generator to output a second amount, greater than the first amount, of the external power.

19. The battery pack as claimed in claim 18, wherein the power generation control signal output terminal transmits the first driving control signal when the charging circuit is not charging the battery cell and the second driving control signal when the charging circuit is charging the battery cell.

20. The battery pack as claimed in claim 18, wherein the power generation control signal output terminal transmits the first driving control signal when a voltage of the battery power is greater than a first predetermined reference value and the power generation control signal output terminal transmits the second driving control signal when the voltage of the battery power is less than a second predetermined reference value.

21. The battery pack as claimed in claim 1, wherein the external power generator is a fuel cell.

22. A power receiving device provided inside an electronic device and receiving power needed to drive an internal circuit of the electronic device, the power receiving device comprising:
a battery input terminal to receive battery power from an external battery;
an external power input terminal to receive external power from an external power generator;
a power output terminal to supply the battery power and the external power to the internal circuit of the electronic device; and
a voltage transforming circuit to transform a voltage of the external power and to transfer the transformed voltage to the power output terminal.

23. The power receiving device as claimed in claim 22, wherein the voltage transforming circuit equalizes the voltage of the external power to a voltage of the battery power.

24. The power receiving device as claimed in claim 22, wherein the voltage transforming circuit boosts the voltage of the external power to a fixed output voltage if the battery power is not supplied to the power output terminal.

25. The power receiving device as claimed in claim 22, wherein the voltage transforming circuit boosts the voltage of the external power according to a voltage of the battery power.

26. The power receiving device as claimed in claim 22, further comprising:
an external power routing switch to control a connection between the external power input terminal and the voltage transforming circuit; and
a controller to switch the external power routing switch between an on position connecting the external power input terminal and the voltage transforming circuit and an off position disconnecting the external power input terminal and the voltage transforming circuit.

27. The power receiving device as claimed in claim 22, further comprising:
a battery routing switch to control a connection between the battery input terminal and the power output terminal; and
a controller to switch the battery routing switch between an on position connecting the battery input terminal and the power output terminal and an off position disconnecting the battery input terminal and the power output terminal.

28. The power receiving device as claimed in claim 22, further comprising:
a first inverse current cut-off element to cut off an inverse current flowing from the internal circuit of the electronic device to the battery input terminal.

29. The power receiving device as claimed in claim 28, further comprising:
a second inverse current cut-off element to cut off an inverse current flowing from the internal circuit of the electronic device to the external power input terminal.

30. The power receiving device as claimed in claim 22, further comprising:
a battery charging terminal to supply a charge power to the external battery;
a charging circuit to receive the external power and to supply the external power to the battery charging terminal; and
a controller to control operations for supplying the external power and the battery power to the internal circuit of the electronic device and for charging the external battery.

31. The power receiving device as claimed in claim 30, wherein the charging circuit converts the external power into a charging voltage adapted for charging the external battery.

32. The power receiving device as claimed in claim 30, further comprising:
a charging switch to control a connection between the power output terminal and the charging circuit.

33. The power receiving device as claimed in claim 30, further comprising:
an external power routing switch to control a connection between the external power input terminal and the voltage transforming circuit.

34. The power receiving device as claimed in claim 30, further comprising:
a battery routing switch to control a connection between the battery input terminal and the power output terminal.

35. The power receiving device as claimed in claim 30, further comprising:
a first inverse current cut-off element to cut off an inverse current flowing from the internal circuit of the electronic device to the battery input terminal.

36. The power receiving device as claimed in claim 35, further comprising:
a second inverse current cut-off element to cut off an inverse current flowing from the internal circuit of the electronic device to the external power input terminal.

37. The power receiving device as claimed in claim 30, wherein the charging circuit receives the external power through the voltage transforming circuit.

38. The power receiving device as claimed in claim 30, wherein the charging circuit receives the external power directly from the external power input terminal.

39. The power receiving device as claimed in claim 30, further comprising:
a power generation control signal output terminal to transmit a driving control signal to the external power generator.

40. The power receiving device as claimed in claim 39, wherein the power generation control signal output terminal transmits a first driving control signal controlling the external power generator to output a first amount of the external power or a second driving control signal controlling the external power generator to output a second amount, greater than the first amount, of the external power.

41. The power receiving device as claimed in claim 40, wherein the power generation control signal output terminal transmits the first driving control signal when the charging circuit is not charging the battery cell and the second driving control signal when the charging circuit is charging the battery cell.

42. The power receiving device as claimed in claim 40, wherein the power generation control signal output terminal transmits the first driving control signal when a voltage of the battery power is greater than a first predetermined reference value and the power generation control signal output terminal transmits the second driving control signal when the voltage of the battery power is less than a second predetermined reference value.

43. A power supplying device to supply battery power and external power to an external load, the device comprising:
- an external power input terminal to receive the external power from an external power generator;
- a voltage transforming circuit to transform a voltage of the external power; and
- a power output terminal to supply the battery power received from a battery cell and the transformed external power in parallel to an external load.

44. The device as claimed in claim 43, wherein the power supplying device further comprises the battery cell.

45. The device as claimed in claim 43, further comprising:
- a battery input terminal to receive the battery power from an external battery comprising the battery cell.

46. The device as claimed in claim 43, wherein the voltage transforming circuit boosts the voltage of the external power according to a voltage of the battery power.

47. The device as claimed in claim 43, further comprising:
- a battery charging terminal to supply a charge power to the battery cell;
- a charging circuit to receive the external power and to supply the external power to the battery charging terminal; and
- a controller to control operations for charging the battery cell.

* * * * *